United States Patent
Zhu et al.

(10) Patent No.: US 7,787,608 B2
(45) Date of Patent: Aug. 31, 2010

(54) COMMUNICATIONS NETWORK SYSTEM FOR IMPLEMENTING MIXED SERVICES AND METHOD THEREOF

(75) Inventors: Dongming Zhu, Shenzhen (CN); Rujie Shao, Shenzhen (CN)

(73) Assignee: Huawei Technology Co., Ltd., Shenzhen (CN)

( * ) Notice: Subject to any disclaimer, the term of this patent is extended or adjusted under 35 U.S.C. 154(b) by 1072 days.

(21) Appl. No.: 11/489,208

(22) Filed: Jul. 19, 2006

(65) Prior Publication Data
US 2007/0071228 A1    Mar. 29, 2007

Related U.S. Application Data

(63) Continuation of application No. PCT/CN2005/001241, filed on Aug. 11, 2005.

(30) Foreign Application Priority Data

Aug. 11, 2004  (CN) .................. 2004 1 0059164
Aug. 11, 2004  (CN) .................. 2004 1 0059165

(51) Int. Cl.
     *H04M 7/00*     (2006.01)
(52) U.S. Cl. ................................. 379/221.09
(58) Field of Classification Search ............ 379/221.09, 379/221.01, 221.13
     See application file for complete search history.

(56) References Cited

U.S. PATENT DOCUMENTS

| | | | |
|---|---|---|---|
| 5,722,905 A * | 3/1998 | Bidelman | 473/451 |
| 5,839,063 A * | 11/1998 | Lee | 455/410 |
| 5,999,610 A * | 12/1999 | Lin et al. | 379/207.02 |
| 6,430,276 B1 * | 8/2002 | Bouvier et al. | 379/121.01 |
| 6,535,599 B1 | 3/2003 | Torrey et al. | |
| 6,571,100 B1 | 5/2003 | Lautenschlager | |
| 6,792,436 B1 * | 9/2004 | Zhu et al. | 1/1 |
| 6,850,173 B1 * | 2/2005 | Steinbrecher | 340/984 |
| 7,184,782 B1 | 2/2007 | Ljungstrom et al. | |

(Continued)

FOREIGN PATENT DOCUMENTS

CN         1276660        12/2000

(Continued)

OTHER PUBLICATIONS

European Search Report from counterpart European application No. 05774458.3, dated Mar. 22, 2007.

(Continued)

*Primary Examiner*—Creighton Smith
(74) *Attorney, Agent, or Firm*—Finnegan, Henderson, Farabow, Garrett & Dunner LLP (57) ABSTRACT

The present invention discloses a communications network system including more than one type of communications network and a centralized subscriber database connected with the more than one type of communications network. The centralized subscriber database is able to process calls accessed via a communications network based on the subscriber data and send back the processing result of the calls to the communications network, which will re-route the calls based on the processing result thereof. Based on the above communications network system, this invention also discloses methods for flexible number plan, various simple services, smooth transfer of PHS subscribers to a 3G network, and short message communications based on flexible number plan.

30 Claims, 6 Drawing Sheets

U.S. PATENT DOCUMENTS

| | | | |
|---|---|---|---|
| 2002/0031207 A1 | 3/2002 | Lin | 379/88.17 |
| 2002/0052211 A1 | 5/2002 | Kim et al. | 455/461 |
| 2004/0090991 A1* | 5/2004 | Cross | 370/486 |

FOREIGN PATENT DOCUMENTS

| | | |
|---|---|---|
| CN | 1457186 | 11/2003 |
| CN | 1489363 | 4/2004 |
| DE | 19724122 | 12/1998 |
| EP | 1 033 897 A1 | 9/2000 |
| EP | 0 738 093 B1 | 6/2003 |

OTHER PUBLICATIONS

International Search Report for PCT/CN2005/001241, dated Nov. 24, 2005.

European Office Action for Application No. 05774458.3-2414, dated Jul. 5, 2007.

* cited by examiner

COMMUNICATIONS NETWORK SYSTEM FOR IMPLEMENTING MIXED SERVICES AND METHOD THEREOF

CROSS-REFERENCES TO RELATED APPLICATIONS

This is a continuation of International Application No. PCT/CN2005/001241, which was filed on Aug. 11, 2005, and which, in turn, claimed the benefit of Chinese Patent Application No. 200410059164.8, which was filed on Aug. 11, 2004, and Chinese Patent Application No. 200410059165.2, which was filed on Aug. 11, 2004, the entire disclosures of which are hereby incorporated herein by reference.

BACKGROUND OF THE DISCLOSURE

1. Field of the Technology

The present invention relates to communication technology, particularly to a communications network system for implementing mixed services and the method thereof.

2. Background of the Invention

Flexible number plan is typically used for a unified management of subscriber numbers within a local communications network. With the flexible number plan, each subscriber will actually have two numbers, one is a logical number published to the public, and the other is a physical number deciding the home network of the subscriber. With such a number issuing solution, the physical number of a subscriber may be changed when the subscriber is transferring among the switching offices, while the logical number thereof remains unchanged. In this way, the subscriber will be of mobility. Apart from among fixed subscribers, the flexible number plan can be implemented among both fixed and mobile subscribers, achieving a function of comprehensive number issuing.

At present, the number used by a subscriber of a Public Switched Telephone Network (PSTN) is tied up with the actual port, device, and network the subscriber actually uses. The location and terminal office to which a subscriber belongs determines the number used by the subscriber, which means that a PSTN subscriber number is of no mobility.

A solution of number portability (NP) has been proposed to solve the problem of moving the number of a PSTN subscriber. NP is typically realized with an intelligent network and a subscriber in the NP solution has two numbers as well, the logical number in public use and the physical number defining the home office. The NP solution with an intelligent network includes primarily the NP process for the calling that converts the physical number of the calling to the logical number thereof for use in displaying the calling number and charging correctly and the NP process for the called that converts the called logical number a subscriber has dialed to the called physical number for use in addressing the called subscriber.

Though the mobility of a number can be realized through the NP solution with an intelligent network, the following problems still exist:

1. As there are various types of switching equipment in the switching offices of a network and some types are unable to insert access codes automatically in accordance with user subscription information, it is difficult to implement the triggering of the above-mentioned service in the entire network, setting limits to the wide application of NP service.
2. Since the NP service requires accessing the call to an intelligent network and converting the number before continuing with the subsequent process, a great number of detour routes are created.
3. An NP service is only a simple process for number conversion while an intelligent network is designed to deal with complicated services. Implementation of an NP service with an intelligent network will occupy a great deal of resources of the intelligent network. As a result, there will be a major impact on the capacity of an intelligent network when an NP service is provided for a large number of subscribers.

SUMMARY OF THE INVENTION

In order to solve the problem in the prior art that number portability is restricted by switching equipment and the implementation occupies resources of an intelligent network, this invention provides a communications network system for implementing various services that are provided for flexible number plan subscribers of fixed and mobile networks.

The present invention also provides a method for implementing the flexible number plan and simple services based on the communications network system so as to realize the flexible number plan as well as various simple services among fixed and mobile subscribers.

The present invention further provides a communications network system able to implement short message communications based on the communications network system, realizing short message communications among fixed and mobile subscribers.

Along with such a system, the present invention provides a corresponding method for implementing short message communications between a fixed network and a mobile network.

The communications network system according to the present invention including more than one type of communications network, and a centralized subscriber database connected with the more than one type of communications network for use of storing subscriber data of subscribers of the communications network system, processing the call that is accessed via one communications network in accordance with the subscriber data, and sending back the processing result to the communications network, which re-routes the call based on the processing result of the call.

The method for implementing the flexible number plan according to the present invention, applicable to a communications network system at least including more than one type of communications network and a centralized subscriber database connected with the communications network, where the mapping relation of the logical number and the physical number of subscribers of the communications network system is stored in advance in the centralized subscriber database, the method includes the steps of:

when the calling initiates a call, the call-originating switching office establishing a relay with the centralized subscriber database and sends the logical number of the called subscriber to the database;

the centralized subscriber database converting the called number based on the self-stored mapping relation of the logical number and the physical number of the subscriber, obtains the physical number of the called and sending back this number to the call-originating switching office;

the call-originating switching office re-routing the call based on the physical number of the called.

The method for implementing mixed services according to the present invention, applicable to a communications network system at least including more than one type of communications network and a centralized subscriber database connected with the communications network, where subscriber data of subscribers of the communications network system are stored in advance in the centralized subscriber database, the method includes the steps of:

when the calling initiates a call, the call-originating switching office establishing a relay with the centralized subscriber database, and sends the calling number and/or the called number to the database;

the centralized subscriber database processing the calling number and/or the called number based on the self-stored subscriber data, and sending back the processed calling number and/or called number to the call-originating switching office;

the call-originating switching office re-routing the call based on the processed calling number and/or called number.

The method for short message communications based on the flexible number plan, applicable to a communications network system at least including more than one type of communications network and a centralized subscriber database connected with the communications network, where the mapping relation of the logical number, physical number and address of the short message center is stored in advance in the centralized subscriber database, the method includes the steps of:

the source short message center, after receiving a request for forwarding a short message, sending the logical number of the destination subscriber to the centralized subscriber database and requesting the address of the destination short message center;

the centralized subscriber database, based on the self-stored mapping relation of the logical number and physical number of subscribers of the communications network system as well as the address of the short message center, finding the physical number of the destination subscriber and the address of the destination short message center based on the logical number of the destination subscriber, and sending back the physical number and the address to the source short message center;

the source short message center forwarding the short message to the destination short message center according to the address of the destination short message center, and the destination short message center issuing the short message to the destination subscriber according to the physical number of the destination subscriber.

Application of the communication network system and the method thereof in accordance with this invention will bring about the following beneficial effects:

1. By establishing a mapping relation between the logical number and the physical number of a subscriber in a centralized subscriber database and conducting number conversion of the calling and the called for calls in the entire network by the centralized subscriber database, the flexible number plan is realized and number portability is no longer restricted by switching devices so that a fixed subscriber is able to move across switching offices like a mobile subscriber.

2. As the centralized subscriber database provides the flexible number plan among fixed subscribers, subscribers of PHS, and mobile subscribers, subscribers of PHS are able to make a smooth transfer to a 3rd generation network.

3. As the centralized subscriber database is in charge of the unified maintenance of authentication data and making centralized authentication, the problem of complicated data maintenance that is brought about when each network jointly maintains one set of authentication data is solved.

4. By establishing a mapping relation between the logical number and the physical number of a subscriber in the centralized subscriber database and converting numbers of the calling and the called by the centralized subscriber database, short message communication is realized and accordingly, the smoothness requirement of service is also satisfied.

5. Put forward are three basic solutions that each short message center makes independent access to the centralized subscriber database to forward short messages across systems, or a new short message gateway is configured to distribute short messages to each of the existing short message centers, or a new comprehensive short message center is established to replace the existing short message centers for each system so as to satisfy networking demands under different circumstances.

DETAILED DESCRIPTION OF THE PREFERRED EMBODIMENTS

In order to implement in a local network the flexible number plan among fixed subscribers and mobile subscribers as well as various mixed services, the core concept of this invention is to construct in the local network a centralized subscriber database for storing the mapping relation of the physical number and logical number and/or relevant data for mixed services and/or centralized authentication data of subscribers of the local network. All the calls originated from the local network will first access to the centralized subscriber database, which will analyze and process the number of calling and the called subscriber. Then the flexible number plan and various mixed services are implemented based on the analysis results of the number of the calling and the called.

Figure 1A:
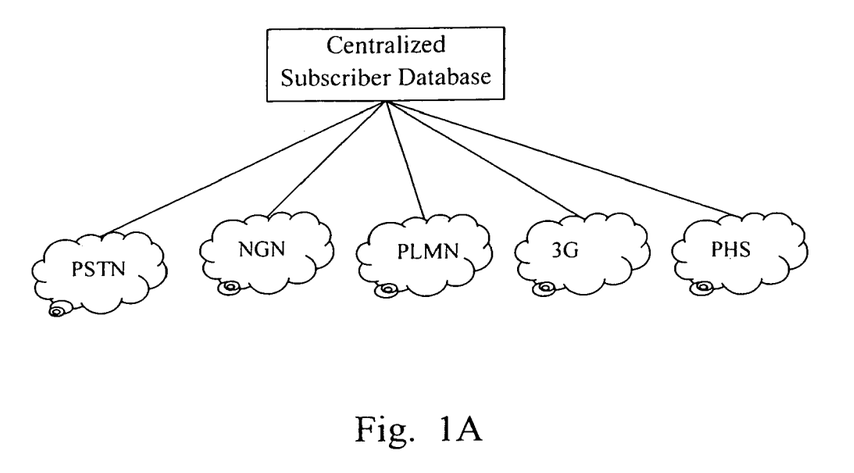
FIGS. 1A and 1B are schematic diagrams illustrating the networking of the communications network system in accordance with this invention.
Figure 1B:
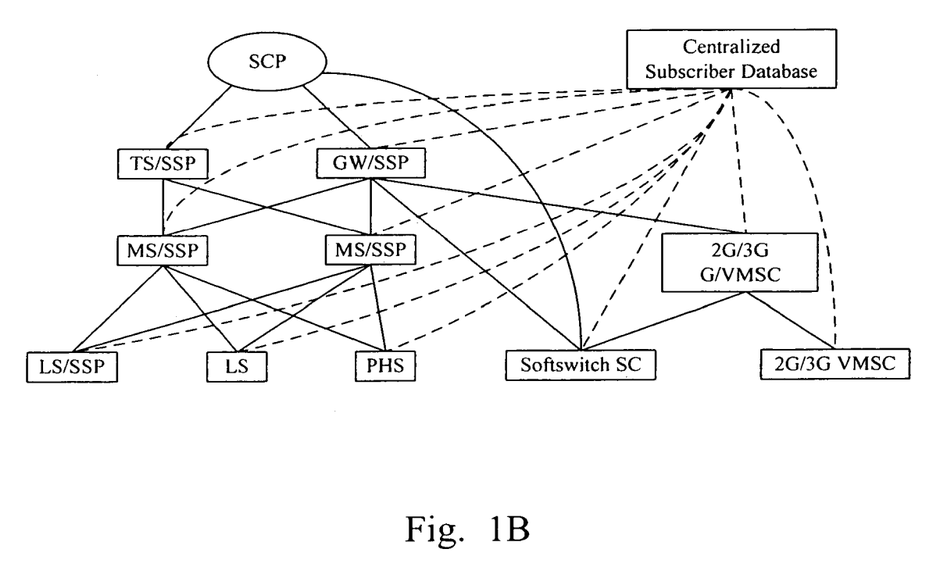

FIG. 1A and FIG. 1B show the networking of the communications network system able to implement the flexible number plan and various mixed services in accordance with this invention.

As shown in FIG. 1A, the communications network system in accordance with this invention includes a centralized subscriber database for storing the mapping relation of the physical number and logical number of subscribers and/or relevant data for mixed services and/or centralized authentication data of subscribers. The centralized subscriber database is connected with the existing communications networks, such as PSTN, Next Generation Network (NGN), Public Land Mobile Network (PLMN), Personal Handyphone System (PSH), and 3rd Generation (3G) Network, where the PSTN, NGN, PLMN, PHS, and 3G network constitute the local network said in this invention.

As shown in FIG. 1B, devices of the centralized subscriber database are connected via ISDN User Part (ISUP) with Location Switch (LS), Tandem Switch (MS), Toll Switch (TS), and gateway offices (GW) in PSTN, LS in a PHS network, and soft switch in NGN; connected via Intelligent Network Application Protocol (INAP) interface with Service Switching Points (SSP) of an intelligent network; and connected via Mobile Application Part (MAP) with mobile LS (Visiting Mobile Switching Center, VMSC) and mobile gateway (Gateway Mobile Switching Center, GMSC) of a 3G network or PLMN.

All the calls originated from the local network will first be switched to the centralized subscriber database by the call originating switching office. The centralized subscriber database makes analysis and processing of numbers of the calling and called based on the self-stored mapping relation of the physical number and logical number of subscribers and/or relevant data for mixed services and/or centralized authentication data, and returns the processing result to the call-originating switching office. The call-originating switching office re-routes and restarts the switching process in accordance with the processing results so as to accomplish the call. By various processing of the calling and called numbers in the centralized subscriber database, the flexible number plan function, various mixed services, and short message communication based on the flexible number plan can be implemented, so is the smooth transfer of PHS subscribers from the PHS to 3G network. The mixed services include such services as Unified Number, Multi-Number-Terminal, and Traveler to Home Service (Mobile Phone Travel to Fixed Phone in Home), etc.

The herein mentioned call-originating switching office refers to a switching office within the local network that originates the call, including LS, TS, GW, SSP to which the calling belongs, and agent MS that operates as an access agent when some of the call-originating switching offices are unable to access the call to the centralized subscriber database.

A method for implementing the flexible number plan based on the communications network system in accordance with this invention is hereinafter described in detail with reference to specific embodiments.

In the above-described communications network system, since the centralized subscriber database has stored the mapping relation of the physical number and logical number of subscribers, the database is able to complete the conversion between the physical number and logical number of a subscriber of the local network, accordingly to implement the flexible number plan function among fixed and mobile subscribers. The calling process based on the flexible number plan can be implemented by any of the three approaches of ISUP signaling, INAP signaling, and MAP signaling.

Figure 2:
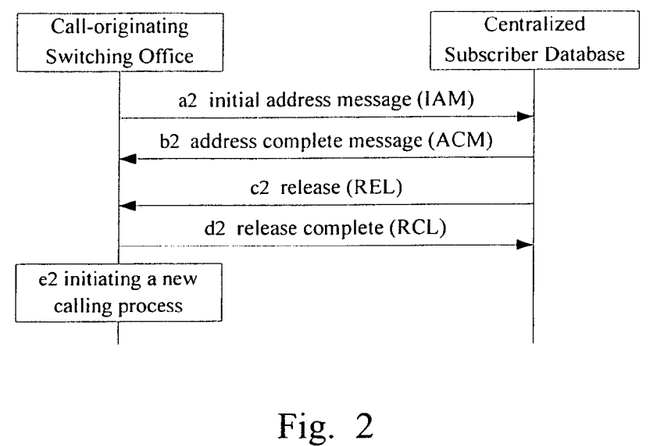
FIG. 2 is the flowchart for implementing the flexible number plan by ISUP signaling.

The calling process based on the flexible number plan implemented by ISUP signaling is shown as FIG. 2. This process is applicable to calls originated by subscribers of PSTN, NGN, or PHS network. With reference to FIG. 2, the process includes the steps of:

Step a2: The calling initiates a call, the call-originating switching office establishes a relay with the centralized subscriber database, and sends the calling and called numbers to the centralized subscriber database through an Initial Address Message (IAM).

In this step, if the calling is a flexible number plan subscriber, the calling number sent will be the physical number of the calling; if the called is a flexible number plan subscriber, the called number sent will be the logical number of the called; if the calling (or the called) is not a flexible number plan subscriber, the number sent will be the logical number of the calling (or the called). In this case, the calling or the called subscriber will have only one number.

Step b2: The centralized subscriber database analyses the number of the calling, converts the physical number of the calling into the logical number thereof if the calling is a flexible number plan subscriber, and returns the logical number of the calling obtained by conversion to the call-originating switching office through an Address Complete Message (ACM).

The logical number of the calling obtained in this step will be used primarily for displaying the calling number and charging of the calling.

Step c2: The centralized subscriber database analyses the number of the called; if the called is a flexible number plan subscriber, the database converts the logical number of the called into the physical number thereof and returns at the same time the physical number of the called to the call-originating switching office through a Release (REL) message to notify the call-originating switching office to re-analyze the called number and re-select the routing in accordance with the physical number of the called; if the called is not a flexible number plan subscriber, the REL message will not carry the physical number of the called.

The physical number of the called obtained in this step will be used primarily for addressing the called subscriber.

Step d2: After receiving the REL message, the call-originating switching office sends a Release Complete (RLC) message to the centralized subscriber database and removes the relay connecting to the centralized subscriber database.

Step e2: The call-originating switching office re-routes the call and initiates a new calling process based on the physical number of the called that is converted and returned by the centralized subscriber database.

The new calling process in this step is the same as the existing calling process.

Figure 3:
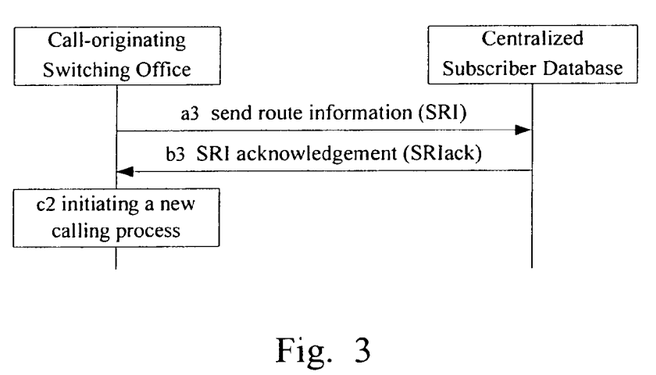
FIG. 3 is the flowchart for implementing the flexible number plan by MAP signaling.

The calling process based on the flexible number plan implemented by MAP signaling is shown as FIG. 3. This process is applicable to calls originated by a PLMN or 3G network. With reference to FIG. 3, the process includes the steps of:

Step a3: The calling initiates a call; the call-originating switching office establishes a relay with the centralized subscriber database, and initiates operation of a Send Route Information (SRI) message with the calling and called numbers to the centralized subscriber database.

In this step, if the calling is a flexible number plan subscriber, the calling number sent will be the physical number of the calling; if the called is a flexible number plan subscriber, the called number sent will be the logical number of the called; if the calling (or the called) is not a flexible number plan subscriber, the number sent will be the logical number of the calling (or the called).

Step b3: The centralized subscriber database analyses the number of the calling and the called; if the calling is a flexible number plan subscriber, converts the physical number of the calling into the logical number thereof; if the called is a flexible number plan subscriber, converts the logical number of the called into the physical number thereof; then returns the logical number of the calling and/or the physical number of the called obtained by conversion to the call-originating switching office through an SRI Acknowledgement Message (SRI ACK).

Step c3: The call-originating switching office re-routes the call and restarts a new calling process based on the logical number of the calling and the physical number of the called that is returned by the centralized subscriber database.

The new calling process in this step is the same as the existing calling process.

Figure 4:
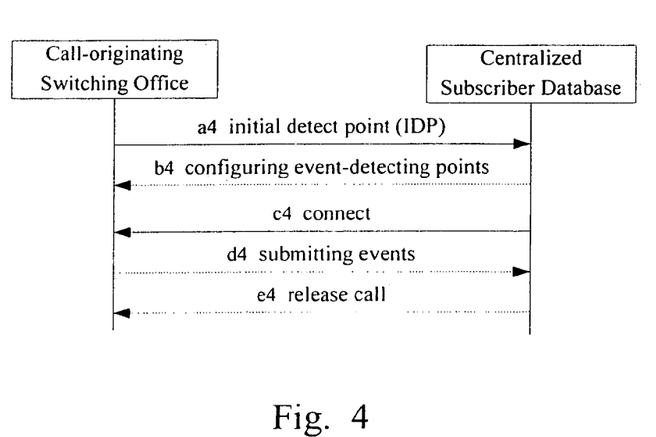
FIG. 4 is the flowchart for implementing the flexible number plan by INAP signaling.

The calling process based on the flexible number plan implemented by INAP signaling is shown as FIG. 4. This process is applicable to calls originated by intelligent network subscribers. With reference to FIG. 4, the process includes the steps of:

Step a4: For all the calls initiated by subscribers of the local office, the call-originating switching office establishes a relay with the centralized subscriber database and triggers an intelligent service; then the call-originating switching office, or SSP, submits the numbers of the calling and the called to the centralized subscriber database through an Initial Detect Point (IDP).

In this step, if the calling is a flexible number plan subscriber, the calling number sent will be the physical number of the calling; if the called is a flexible number plan subscriber, the called number sent will be the logical number of the called; if the calling (or the called) is not a flexible number plan subscriber, the number sent will be the logical number of the calling (or the called).

Step b4: The centralized subscriber database configures appropriate event-detecting points (RRBE), and requests SSP to submit appropriate information to the centralized subscriber database when encountering the appropriate event-detecting points.

Step c4: The centralized subscriber database carries out the service processing based on the calling and called numbers; if the calling is a flexible number plan subscriber, converts the physical number of the calling into the logical number thereof; if the called is a flexible number plan subscriber, converts the logical number of the called into the physical number thereof; then issues the logical number of the calling or the physical number of the called obtained by conversion to SSP through a Connect message.

Step d4: SSP makes detection according to the detecting points configured in step b3, and submits the event (ERB) after detecting an appropriate event.

Step e4: After receiving the event submitted by SSP, the centralized subscriber database removes the relay between SSP and the centralized subscriber database through a Release call process.

Note that steps b4, d4, and e4 are optional, as shown by the dotted arrows in FIG. 4, that is, after receiving an IDP message from the call-originating switching office, the centralized subscriber database can make number conversion based on the calling and called numbers, then issues the Connect message carrying the logical number of the calling or the physical number of the called to the appropriate SSP through a conversation complete message (TC-End), ends the conversation, and removes the corresponding connection.

It can be seen from the above three processes that, by establishing in the local network a centralized subscriber database for storing the mapping relation of the physical number and the logical number of subscribers and completing conversion between a logical number and a physical number by the database, the method for implementing flexible number plan as embodied in the preferred examples of this invention can realize the flexible number plan in PSTN, NGN, PHS, PLMN, and 3G network.

It can be appreciated by people skilled in the art that the centralized subscriber database can be served as a processing center for various mixed services in the entire network after the database has stored the service data of mixed services like the subscription data of intelligent service, service data of WAC subscribers, service data of Traveler to Home service subscribers, authentication data, service data of Multi Subscriber Number service, and service data of Multi-Terminal-Number (or Unified Number) service.

The above mixed services either relate to services requiring number conversion or are services with simple logic operation. Therefore, these services are referred to as simple services. As a result, the centralized subscriber database becomes the data center and control center in fact, and evolves on this basis into the processing center of simple services for the entire network, handling the services with simple logic and non-interactive operations in a centralized way.

When the centralized subscriber database is used as the simple service center, the basic calling process of various simple services is as follows: all the calls originated from the local network are first routed to the centralized subscriber database, the database processes the calling and called numbers, and then the call-originating switching office continues with the subsequent switching process according to the processing result of the calling and called numbers.

During the processing of the calling and called numbers, the centralized subscriber database can decide, in accordance with the subscription data about attributes of intelligent service, whether the calling or the called has subscribed to any of the intelligent services. If one of them has subscribed to an intelligent service, the database will insert the access code directly before the number of the calling or the called and conveniently implement an entire-network triggering of the intelligent service. The centralized subscriber database can also make conversion of the calling and called numbers based on the service data of WAC subscribers, Traveler to Home service subscribers, Multi Subscriber Number service and Unified Number service so as to obtain the real number of the called subscriber and realize the above simple services.

The method for implementing various above-mentioned simple services is hereinafter described in detail with reference to specific embodiments.

Described in the first place is the method for triggering an intelligent service in the entire network based on the communications network system in accordance with this invention.

If the centralized subscriber database has stored the subscription data of a subscriber for an intelligent service, the database can implement triggering of the intelligent service in the entire network through ISUP signaling, INAP signaling, or MAP signaling. The basic method is as follows: When the centralized subscriber database makes analysis of the calling and called numbers, if the calling has subscribed to an intelligent service, insert the calling access code of the intelligent service before the called number; if the called has subscribed to the intelligent service, insert the called access code of the intelligent service before the called number. Then return the converted calling and called numbers to the call-originating switching office, which will relay the call to SSP in accordance with the converted calling and called numbers. SSP will in turn implement the access to the intelligent service in accordance with the intelligent service access code.

Figure 5:
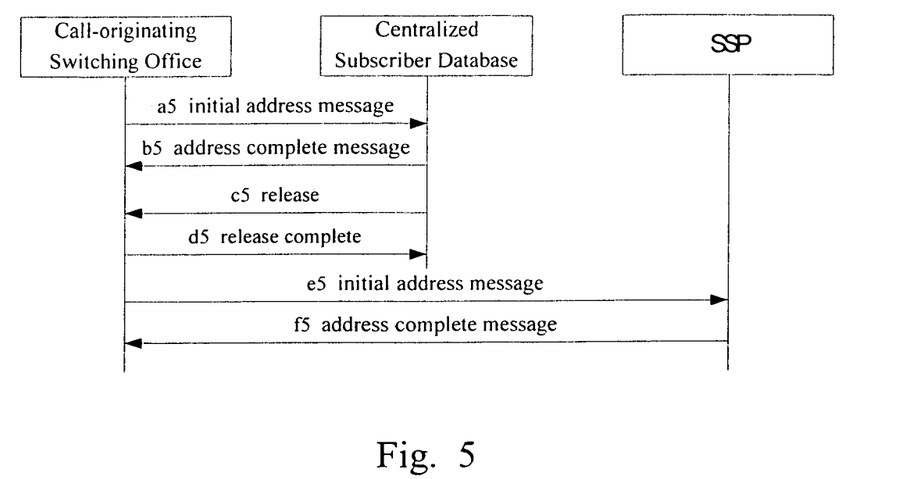
FIG. 5 is the flowchart for the intelligent service triggering by ISUP signaling with the centralized subscriber database as the center of simple services.

The method for implementing triggering of an intelligent service in the entire network by means of the centralized subscriber database is hereinafter described with reference to the example of ISUP signaling. This method is applicable to calls initiated by subscribers of ISDN, NGN, PHS networks. With reference to FIG. 5, the process of triggering an intelligent service in the entire network is as follows:

Step a5: The calling initiates a call, the call-originating switching office establishes a relay with the centralized subscriber database, the call-originating switching office sends to the database an IAM message, and the calling number the message carries is the physical number while the called number it carries is the logical number.

Step b5: The centralized subscriber database converts the physical number of the calling into the logical number thereof, and then returns to the call-originating switching office an ACK message which carries the logical number of the calling.

In the above steps, if the calling is not a flexible number plan subscriber, the IAM in Step a5 will carry the logical number of the calling and there is no need to perform Step b5.

Step c5: The centralized subscriber database makes analysis of the logical numbers of the calling and called; when it is learned by analysis that the calling or the called has subscribed to an intelligent service, the database will send the access code of the intelligent service to the call-originating switching office through an REL message.

Step d5: After receiving the REL message, the call-originating switching office sends to the centralized subscriber database an RLC message and removes the relay connecting the database.

Step e5: The call-originating switching office sends to SSP an IAM message, and the calling number in the IAM message is the logical number thereof while the called number therein is the access code of the intelligent service plus the logical number of the called.

Step f5: SSP returns an ACK message to the call-originating switching office.

Thereafter, SSP enters the subsequent process of ring playing and number receiving, and the subsequent service process is the same as the existing process.

The above process of triggering an intelligent service in the entire network is described by taking ISUP signaling as an example. Triggering of an intelligent service in the entire network can also be implemented by MAP signaling or INAP signaling and the processes thereof are similar to the above process.

As can be seen from the above processes of triggering an intelligent service in the entire network with and without flexible number plan, triggering of an intelligent service can be easily implemented by storing in the centralized subscriber database users' subscription data for an intelligent service and inserting the access code of the intelligent service by the database in the number analysis process.

Described next is the method for implementing WAC service based on the communications network system in accordance with this invention.

Figure 6:
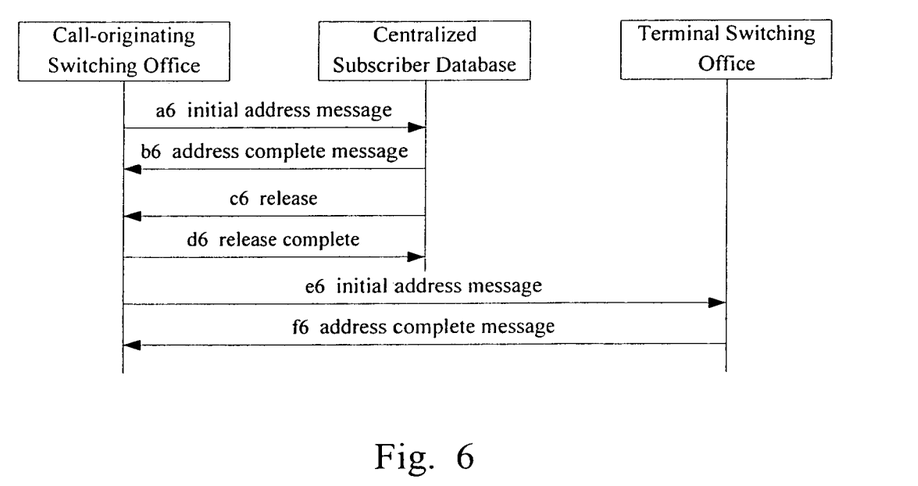
FIG. 6 is the flowchart for implementing WAC (Wide area CENTREX) service by ISUP signaling with the centralized subscriber database as the center of simple services.

By storing in the centralized subscriber database the data of WAC subscribers, WAC service can be implemented as well. FIG. 6 shows the handling process of WAC service based on ISUP signaling. With reference to FIG. 6, the process includes primarily the steps of:

Step a6: The calling initiates a call, the call-originating switching office establishes a relay with the centralized subscriber database, the call-originating switching office sends to the database an IAM message, and the calling number the message carries is the physical number while the called number it carries is the short number of the called.

Step b6: The centralized subscriber database makes analysis of the physical number of the calling for the WAC cluster where the calling subscriber is, obtains the short number of the calling and returns it to thecall-originating switching office through an ACK message.

Step c6: The centralized subscriber database makes analysis of the called number, makes conversion of the long number and short numbers of the called according to the WAC cluster where the calling and called are, and sends back the out-group prefix plus the long number of the called to the call-originating switching office through an REL message.

Step d6: The call-originating switching office, after receiving the REL message sent by the database, sends to the centralized subscriber database an RLC message and removes the relay connecting the database.

Step e6: The call-originating switching office sends an IAM message to the terminal switching office according to the physical number of the called, and initiates a new calling process, where the calling number is the short number of the calling and the called number is the long number of the called.

Step f6: The terminal switching office returns an ACK message to the originating terminal office.

The subsequent service process is the same as the existing process.

It is seen from the above process that WAC service can be easily implemented by storing in the centralized subscriber database the data of WAC subscribers and making conversion between the long and short numbers of WAC subscribers by the database. Although this embodiment is described by taking ISUP signaling as an example, it can be appreciated by people skilled in the art that the WAC service can also be implemented using MAP signaling or INAP signaling.

Described next is the method for implementing the services of Unified Number, Multi Subscriber Number, and Traveler to Home service with the communications network system in accordance with this invention.

Figure 7:
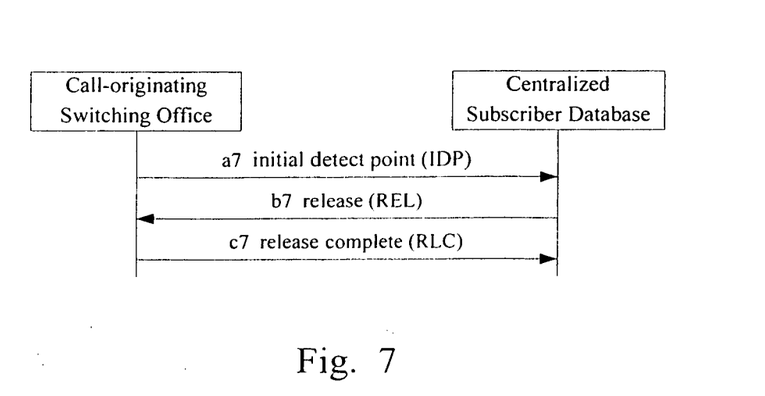
FIG. 7 is the flowchart for implementing the services of Unified Number, Multi-Subscriber Number, and Traveler to home with the centralized subscriber database as the center of simple services.

If the service data for the Unified Number service, the Multi Subscriber Number service, and the Traveler to Home service are stored in the centralized subscriber database, the database can implement the above services by number conversion. The specific calling process of implementing the above services by ISUP signaling is shown as FIG. 7:

Step a7: The calling initiates a call, the call-originating switching office establishes a relay with the centralized subscriber database, and the call-originating switching office switches the call to the database through an IAM message. This IAM message carries the calling and called number.

Step b7: The centralized subscriber database makes analysis of the called number, completes the conversion of the called number, returns the converted called number to the call-originating switching office through an REL message, and instructs the originating switching office to switch the call in accordance with the converted called number.

In this step, the number conversion includes: if the called is a subscriber of Unified Number service, inquiring for the current real location number of the Unified Number subscriber; if the called is a Multi Subscriber Number user, inquiring for the physical number corresponding to the logical number of the called; or if the called is a Traveler to Home subscriber, inquiring for the family fixed phone number registered by the subscriber.

Step c7: After receiving the REL message sent by the centralized subscriber database, the call-originating switching office sends an RLC message to the database, removes the relay connecting to the database, and continues with the subsequent switching process in accordance with the converted called number.

The subsequent switching process said in this step is the same as the existing switching process.

The above calling process of simple services are described by taking ISUP signaling as the example while the process can also be implemented by MAP signaling or INAP signaling, and the processes thereby are basically the same.

Figure 8:
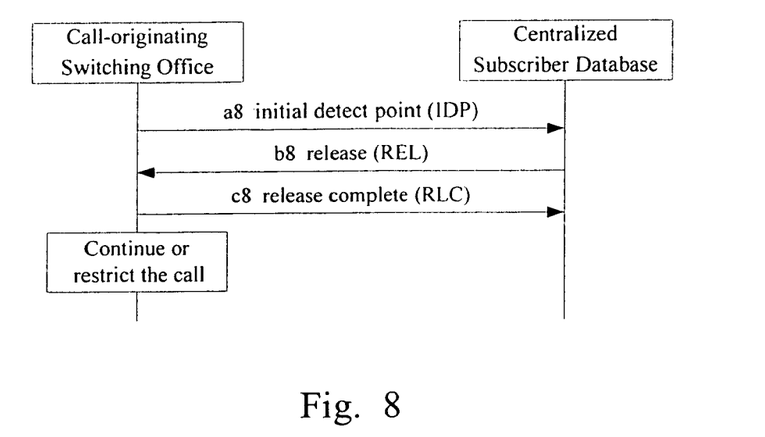
FIG. 8 is the flowchart for implementing the service of network traffic manager with the centralized subscriber database as the center of simple services.

Likewise, if the network traffic information of subscribers is stored in the centralized subscriber database, it is then possible to decide according to the subscriber data the call enabling or disabling relation of the calling and called subscribers or the proportioned call enabling/disabling relation thereof, and the relevant calling information like call-enabling or call-disabling can be sent back to the call-originating switching office so that the originating office can be instructed to continue with a call or restrict a call. The basic implementing process based on ISUP signaling is shown as FIG. 8:

Step a8: The calling initiates a call, the call-originating switching office established a relay with the centralized subscriber database, and the call-originating switching office switches the call to the database through an IAM message, which carries the logical number of the calling and the logical number of the called.

Step b8: The centralized subscriber database decides, according to the logical numbers of the calling and the called and the self-stored network traffic information, whether to enable or disable this call.

Step c8: The centralized subscriber database sends back the call-enabling or disabling information to the call-originating switching office through an REL message and instructs the originating office to continue this call or stop it.

Step d8: After receiving the REL message sent by the centralized subscriber database, the call-originating switching office sends to the database an RLC message, removes the relay connecting to the database, and continue with or stop this call in accordance with the call-enabling or disabling information.

In addition, it can be appreciated by people skilled in the art that the centralized subscriber database can make authentication for the calling and called subscribers as a centralized authentication center because authentication data of subscribers can be stored in the database in the communications network system in accordance with this invention. Therefore, in the processes as shown in FIGS. 2-8, when making analysis of the calling and called numbers, the centralized subscriber database can further make authentication for the calling and called subscribers based on the authentication data of the calling and called subscribers, and thereby decides whether to continue with or stop the call. If the authentication succeeds, the database will notify the call-originating switching office to continue with the call; if the authentication fails, it is needed to notify the call-originating switching office to remove this call.

The above-said method of implementing centralized authentication by using the centralized subscriber database no longer requires that GW of each network make authentication for the calling and called subscribers, respectively, based on the calling and called numbers of a call. Only one set of authentication data is maintained in the centralized subscriber database. As a result, the problem of multi-location maintenance and complicated data invoked by the need of maintaining a set of authentication data in every network can be solved.

Apart from flexible number plan, triggering of an intelligent service in the entire network, and various simple services, the short message (SM) service based on flexible number plan can be implemented as well by using the centralized subscriber database of the communications network system in accordance with this invention.

In terms of short message services, there have so far existed short message system of fixed network (including PSTN/NGN short message system), PHS short message system, GSM short message system, and CDMA short message system. There will be 3G short message systems provided for 3G network. As the short message systems are independent from each other, each short message center (SMC) has to communicate with other centers through Short Message Point to Point (SMPP) protocol. When short messages are delivered across networks, they are forwarded by short message centers so as to implement trans-network short message communications.

Typically, a short message center decides the home network of a subscriber according to a number segment, which requires numbering of subscribers be regular. In terms of services which involve number portability and flexible number plan, however, this number issuing approach will make the short message center unable to find the home network of the subscriber after the subscriber moves to another network, which means the existing short message systems do not support trans-network moving of subscribers.

The communications network system in accordance with this invention is able to support short message communications among flexible number plan subscribers of fixed networks (PSTN/NGN), PHS, 2G, and 3G network by means of the centralized subscriber database. Number conversion of the calling and called can be made by using the mapping relations of the logical number, physical number and the address of the short message center to which a subscriber currently belongs that have been established in the centralized subscriber database. In this way, even with flexible number plan, the short message centers originating short messages in PTSN, NGN, PLMN, PHS, and 3G network may all make access to the centralized subscriber database to find the physical number of the destination subscriber and the short message center where the subscriber is. Thus, when a subscriber of a network transfers to another network, the originating short message center will still be able to find the subscriber. Thereby implement short message communications among flexible number plan subscribers.

In order to implement the above function, it is necessary to connect the short message center of each network, such as a fixed network (PSTN/NGN), PHS, 2G, or 3G network, to the centralized subscriber database of the communications network system in accordance with this invention. The connection may be implemented in the following three ways:

First: Connect all the short message centers of the networks to the centralized subscriber database, with each short message center accessing the database independently and forwarding trans-system short messages independently;

Second: Configure in the communications network system a comprehensive gateway connecting to each short message center, which will make interaction with the centralized subscriber database and distribute the short messages;

Third: Create a comprehensive short message center in the communications network system to replace all the existing short message centers in each system, and the comprehensive short message center will make interaction with the centralized subscriber database and distribute the short messages.

Hereinafter the systems for implementing flexible number plan based short message communications in accordance with the above three approaches and the methods thereof will be described in detail with reference to specific embodiments.

Figure 9:
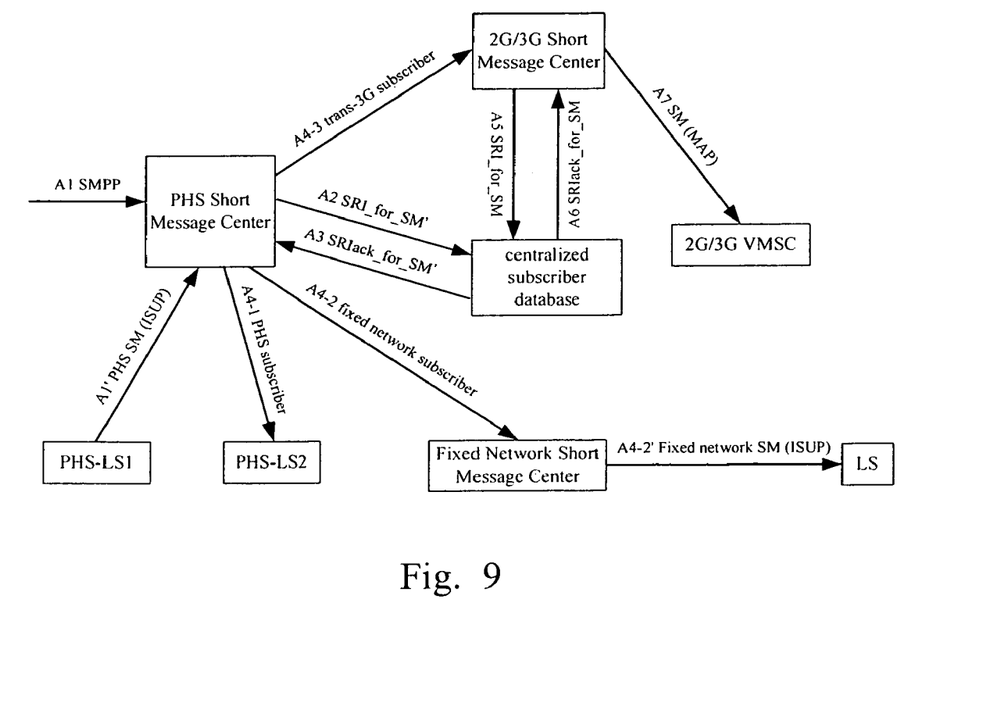
FIG. 9 is a schematic diagram illustrating the system networking for connecting short message centers of each network directly to the centralized subscriber database to realize short message communication based on the flexible number plan.

FIG. 9 shows the system networking for implementing flexible number plan based short message communications by connecting short message centers of each network directly to the centralized subscriber database. As shown in FIG. 9, in this embodiment, short message centers of PSTN, NGN, PLMN, PHS, and 3G network send special short message routing request messages to the centralized subscriber database via respective extended MAP interfaces thereof. The centralized subscriber database, after deciding that the request currently received is a special short message routing request, inquires for the subscriber's data according to the mapping relation of the logical and physical numbers of the subscriber and sends back to the corresponding short message center the physical number of the subscriber and the address of the corresponding short message center. The short message center then forwards the short message to the destination short message center or directly issues the short message according to the result of inquiry.

Take a destination subscriber whose home network is a PHS network as an example, then the method of implementing short message communications in this embodiment includes the following steps, refer to FIG. 9:

Step A1, A1': A short message comes from a PHS terminal office, PHS-LS1 (through ISUP or MAP signaling), or from a short message center of another area/network through SMPP;

Step A2: The PHS short message center sends to the centralized subscriber database the logical number of the destination subscriber through an extended SRI_for_SM message;

Step A3: The centralized subscriber database looks up the physical number and the home short message center of the destination subscriber based on the logical number thereof and sends back the physical number and home short message center found to the PHS short message center by sending a SRIack_for_SM message.

In this step, as there have been stored authentication data for subscribers in the centralized subscriber database, the database is able to make authentication first according to the calling and called numbers. If the authentication fails, the database will notify the PHS short message center to stop forwarding the short message.

Step A4: Based on the physical number and the home short message center of the destination subscriber, the PHS short message center will make different operations:

Step A4-1: If the destination subscriber is a PHS subscriber, that is, the number of the destination short message center that is sent back by the database is the same as the address of this short message center or the Location Routing Number (LRN) sent back indicates that the destination subscriber is a PHS subscriber, then the PHS short message center will issue the short message to the PHS terminal office PHS-LS2 in the mode of PHS short message by ISUP signaling and ends the process.

Step A4-2, A4-2': If the destination subscriber is actually a fixed network (PSTN/NGN) subscriber, that is, the database sends back the address of a fixed network short message center or the subscriber's LRN indicates a fixed network LS, then the PHS short message center will forward the short message in accordance with SMPP to the fixed network (PSTN/NGN) short message center, which in turn forwards the short message to the fixed network LS by ISUP signaling for subsequent processing and then ends the process.

Step A4-3: If the destination subscriber is a subscriber transferred to a 3G network, that is, the database sends back the short message center number of a 3G network, the PHS short message center will forward the short message to the short message center of the 3G network in accordance with SMPP. Then perform steps A5-A6;

Steps A5-A6: The short message center of the 3G network makes interaction with the centralized subscriber database by operation of the SRI_for_SM and SRIack_for_SM messages to obtain the address of the destination subscriber, and then performs step 7;

Step A7: The short message center of the 3G network issues the short message to the destination subscriber according to the obtained address of the destination subscriber, and then ends the process.

Figure 10:
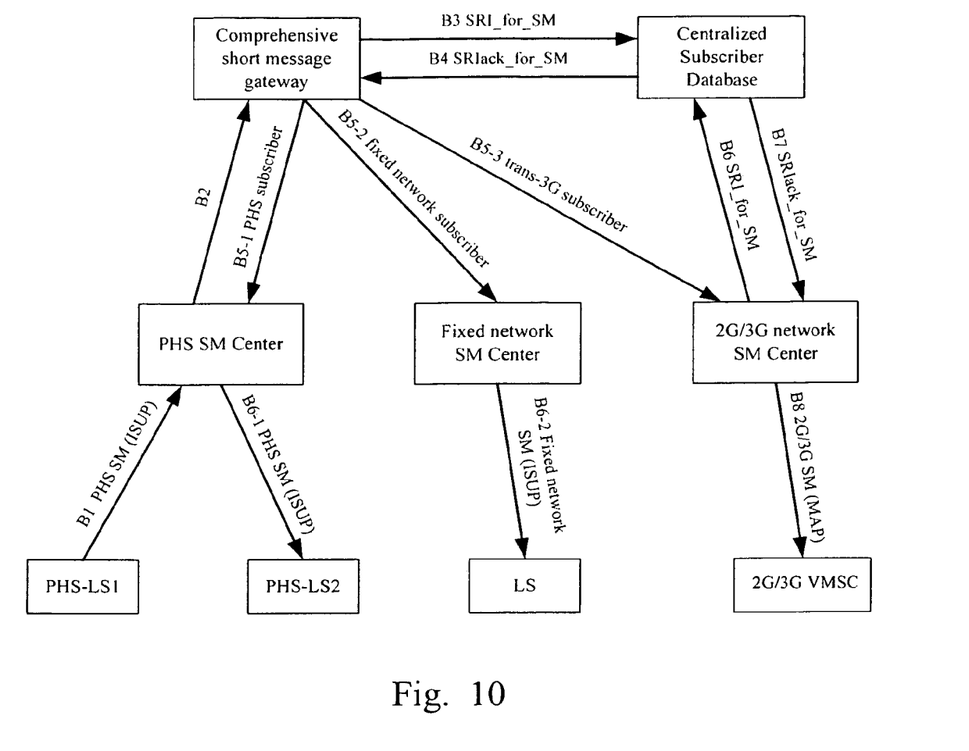
FIG. 10 is a schematic diagram illustrating the system networking for implementing short message communication based on the flexible number plan by configuring a new comprehensive short message gateway.

FIG. 10 shows the system networking for implementing flexible number plan based short message communication with a new comprehensive short message gateway. As shown in FIG. 10, in this embodiment, a new comprehensive short message gateway is used as the comprehensive short message gateway in this flexible number plan area and makes interaction with the centralized subscriber database via the interface of the extended MAP to obtain the type and routing of the subscriber and forward the short message to the home short message center of the destination subscriber through SMPP. In this embodiment, the short message center of a 3G network is directly connected with the centralized subscriber database and obtains the information about the destination subscriber by direct interaction with the database while short message centers of other networks make interaction with the centralized subscriber database through the comprehensive short message gateway. It is obvious that the short message center of a 3G network may not be connected directly with the centralized subscriber database, either, but makes interaction with the database through the comprehensive short message gateway so as to obtain the information about the destination subscriber.

Note that the short message gateway herein refers to the short message system unit commonly used by the existing short message platforms and is used as the interface gateway between the short message system and the centralized subscriber database. In form, it does not particularly refer to the existing interactive gateway. Functions of this new short message gateway include inquiry in the centralized subscriber database, distribution of short message among different platforms, and subscriber authentication, which may be jointly accomplished by the existing interactive gateway or other short message system unit, for instance, the authentication, authorization, accounting (AAA) server.

Again, take a destination subscriber of PHS as an example to describe in detail the short message communications in this embodiment:

Step B1: A short message comes from a PHS subscriber (ISUP/MAP) or from a short message center of another area/network (SMPP);

Step B2: The short message center submits the received short message to the comprehensive short message gateway;

Steps B3-B4: The comprehensive short message gateway makes interaction with the centralized subscriber database through operation of extended SRI_for_SM and SRIack-_for_SM messages to obtain the physical number and the home short message center of the destination subscriber;

Step B5: The comprehensive short message gateway makes different processing according to the results sent back by the centralized subscriber database:

Step B5-1: If the destination subscriber is a PHS subscriber, that is, the number of the destination short message center and LRN of the destination subscriber is PHS, then the comprehensive short message gateway forwards the short message to the PHS short message center through SMPP, the PHS short message center issues the short message to PHS-LS2 in the mode of PHS short message by ISUP signaling, and then ends the process.

Step B5-2, B6-2: If the destination subscriber is a fixed network subscriber, that is, the database sends back the address of a fixed network short message center or the subscriber's LRN indicates a fixed network LS, then the comprehensive short message gateway forwards the short message in accordance with SMPP to the short message center of the fixed network, which in turn forwards the short message to the fixed network LS by ISUP signaling for subsequent processing and then ends the process.

Step B5-3: If the destination subscriber is a subscriber transferred to a 2G/3G network, that is, the database sends back the number of the short message center of a 2G/3G network, then the comprehensive short message gateway will forward the short message in accordance with SMPP to the short message center of the 2G/3G network for processing, then perform steps B6-B8;

Steps B6-B8: After the short message arrives at the short message center of the 2G/3G network, the short message center makes interaction with the centralized subscriber database by operation of the SRI_for_SM and SRIack_for_SM messages to obtain the physical number and the home switching office of the destination subscriber and forwards the short message.

Figure 11:
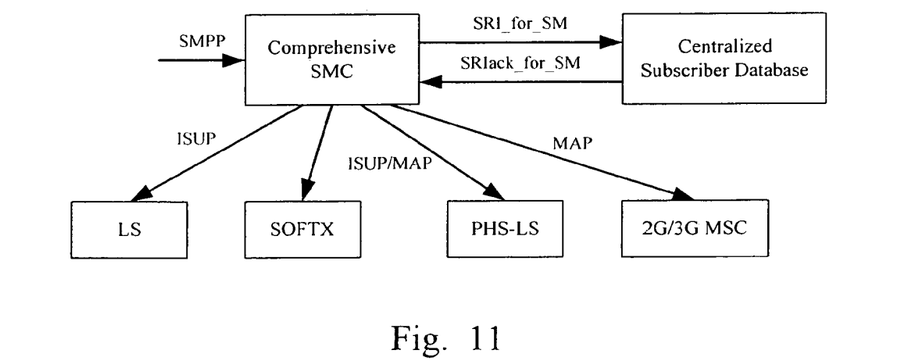
FIG. 11 is a schematic diagram illustrating the system networking for implementing short message communication based on the flexible number plan by establishing a new comprehensive short message center.

FIG. 11 shows the system networking for implementing flexible number plan based short message communication with a new comprehensive short message center. As shown in FIG. 11, in this embodiment, a new comprehensive short message center (SMC) is configured. This comprehensive SMC is connected with fixed network LS via ISUP interface, connected with PHS LS in PHS system via ISUP/MAP interface, connected with a mobile switching center (MSC) in a mobile network via MAP interface, and connected with VMSC in a 3G network via MAP interface. Short messages of fixed network (PSTN/NGN), 2G mobile network, PHS, and 3G network are processed in a unified way through the interaction between this comprehensive SMC and the centralized subscriber database, that is, the comprehensive SMC replaces the short message centers in each of the networks.

In the networking structure shown as FIG. 11, when the comprehensive SMC receives a request for forwarding a short message, it will make interaction with the centralized subscriber database by operation of the extended SRI_for_SM and SRIack_for_SM messages to obtain the physical number and home switching office of the destination subscriber and issue the short message.

It can be seen from the above process that the short message services of all networks in the flexible number plan area can be processed in a unified way by the new comprehensive SMC, thus avoiding the need for sharing information to forward short messages across systems and make authentication.

The above described embodiments provide the function of short message communications based on flexible number plan among fixed network, PHS, mobile network, and 3G network by making each of the short message centers independently access to the centralized subscriber database to forward trans-network short messages, or configuring a new comprehensive short message gateway to distribute short messages to former short message centers, or configuring a new comprehensive short message center to replace former short message centers of each of the networks to forward short messages within the system or across the systems.

Apart from the above, the centralized subscriber database of the communications network system in accordance with this invention can be used to implement a smooth transfer of PHS subscribers to a 3G network.

Along with the development of 3G network, PHS subscribers wish to be transferred to a 3G network so as to enjoy 3G services. However, it is only possible at present for a PHS subscriber to change the number thereof in order to be transferred to a 3G network, that is, a smooth transfer to a 3G network is so far impossible.

With the communications network system in accordance with this invention, the centralized subscriber database can be merged with the home location register (HLR) in a 3G network and a trans-3G flag can be configured in the database so as to realize a smooth transfer of PHS subscribers to a 3G network.

A detailed description of the method for implementing a smooth transfer of PHS subscribers to a 3G network based on the communications network system of this invention is hereinafter given with reference to a specific embodiment.

Figure 12:
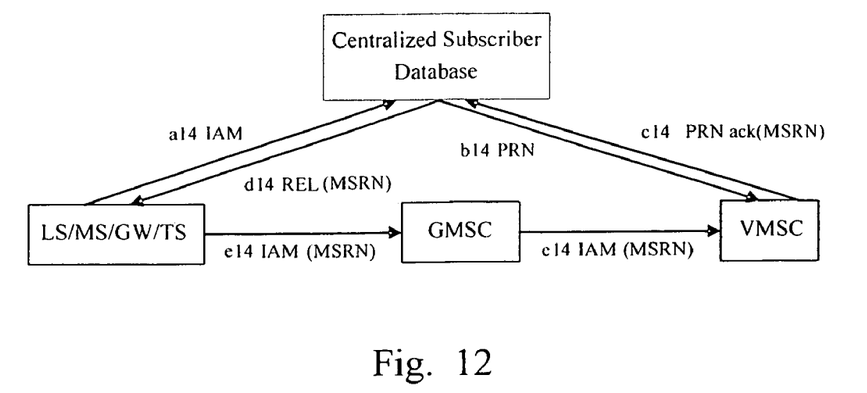
FIG. 12 is a schematic diagram illustrating the networking for implementing a smooth transfer of PHS subscribers to a 3G network by merging the centralized subscriber database with HLR of the 3G network.
Figure 13:
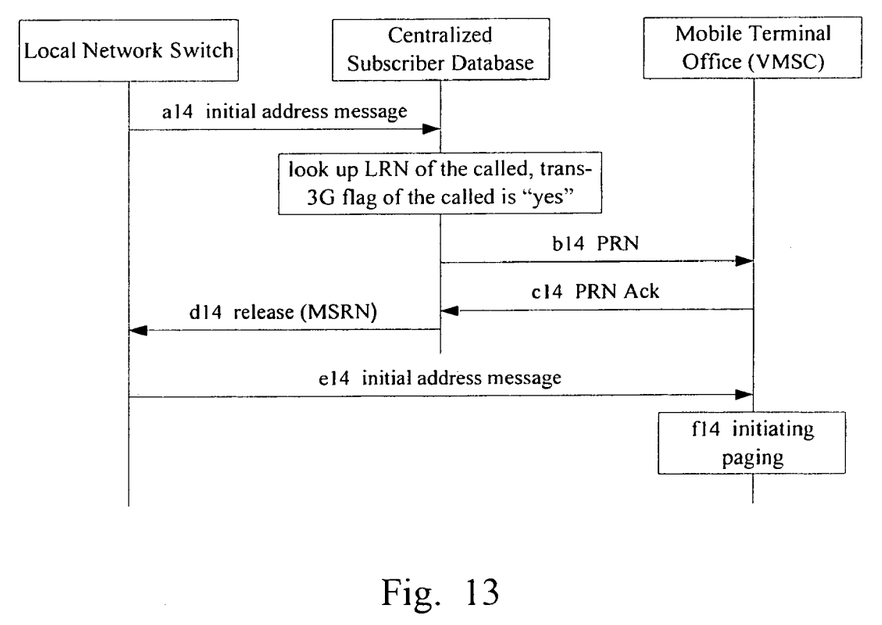
FIG. 13 is the service flowchart for PHS subscribers to transfer to 3G network.

In the method of this embodiment, after a PHS subscriber has been transferred to a 3G network, it is needed to configure a trans-3G flag for the PHS subscriber and set the flag to "yes" to indicate the PHS subscriber has transferred to a 3G network. The processing of the PHS subscriber as the called is shown as FIGS. 12 and 13:

a14. After a subscriber of this network or another network has made a call to the PHS subscriber using the former fixed-network number thereof, the fixed local network switch (LS/TS/MS/GW) where the PHS subscriber was will send an IAM message to the centralized subscriber database to look up in the database the routing number (LRN) of the called;

b14. After finding the LRN of the PHS subscriber, the centralized subscriber database makes further analysis of the corresponding trans-3G flag thereof, if the flag is "yes", that is, the PHS subscriber has transferred to a 3G network, then initiates an operation of providing roaming number (PRN) to the visiting mobile switching center/visiting location register (VMSC/VLR) where the PHS subscriber is according to the recorded VMSC/VLR number of the PHS subscriber;

In this embodiment, the centralized subscriber database has merged with the HLR of the 3G network. Therefore there has been stored in the database the number of VMSC/VLR to which the subscriber currently belongs;

c14. The VMSC/VLR where the PHS subscriber is assigns a roaming number (MSRN) to the subscriber and sends the MSRN to the centralized subscriber database via a PRN Ack message;

d14. The centralized subscriber database sends the obtained MSRN to the fixed local network switch via an REL message;

e14. The fixed local network switch re-select the routing based on the obtained MSRN, and routes the call to the VMSC where the PHS subscriber is via an IAM message carrying MSRN;

The fixed local network switch may also route the call to a GMSC, which will decide that this number is an MSRN by identifying the number segment of MSRN, analyze the MSRN, and route the call according to the analysis to the VMSC where the PHS subscriber is;

f14. VMSC makes inquiry of the subscriber data in VLR according to the received MSRN, initiates paging based on the information in the location field of the subscriber data and connects the call after the subscriber makes response.

In this step, the subscriber data recorded in VLR is inserted by the centralized subscriber database when the location of the PHS subscriber is updated.

As can be seen from the above process, with the method of this embodiment, a trans-3G flag for a PHS subscriber can be configured in the centralized subscriber database of the communications network system such that the database is able to learn that the PHS subscriber has transferred to a 3G network and to find the roaming number of the current PHS subscriber, thus completing the call for the PHS subscriber and realizing a smooth transfer of the PHS subscriber to a 3G network.

The invention claimed is:

1. A communications network system, comprising:
more than one type of communications network;
a centralized subscriber database connected with the more than one type of communications network, for storing subscriber data of subscribers of the communications network system, processing a call that is accessed via one communications network in accordance with the subscriber data, and sending back a processing result to the corresponding communications network, which re-routes the call based on the processing result of the call.

2. The communications network system according to claim 1, wherein the subscriber data of subscribers of the communications network system stored in the centralized subscriber database comprises a mapping relation of the logical number and the physical number of subscribers of the communications network system and/or relevant data of mixed services and/or centralized authentication data of the communications network system.

3. The communications network system according to claim 1, wherein the more than one type of communications network comprises Public Switched Telephone Network (PSTN), Public Land Mobile Networks (PLMN), Personal Handyphone System (PHS), Next Generation Network (NGN) and the 3rd generation (3G) network.

4. The communications network system according to claim 3, wherein
the centralized subscriber database is connected with a Location Switch (LS), a Tandem Switch (MS), a Toll Switch (TS), and a Gateway Office (GW) of the PSTN, a Terminal Office of PHS, or a soft switch terminal office of a Next Generation Network via an interface of Integrated Service Digital Network User Part (ISUP);
the centralized subscriber database is connected with a Service Switching Point (SSP) of an intelligent network via Intelligent Network Application Protocol (INAP);
the centralized subscriber database is connected with a visiting Mobile Switching Center (VMSC) or a Gateway Mobile Switching Center (GMSC) of the PLMN or the 3G network via an interface of Mobile Application Part (MAP).

5. The communications network system according to claim 3, wherein the centralized subscriber database is connected to short message centers of the PSTN, PLMN, PHS or 3G network via an extended interface of MAP.

6. The communications network system according to claim 3, further comprising:
a comprehensive short message gateway connected to the centralized subscriber database, for making interaction with the centralized subscriber database and distributing short messages; wherein
the centralized subscriber database is connected to a comprehensive short message gateway by an extended interface of MAP; and
the comprehensive short message gateway is connected to short message centers of the PSTN, PLMN, PHS, or 3G network by Short Message Point to Point Protocol (SMPP).

7. The communications network system according to claim 3, further comprising:
a comprehensive short message gateway connected to the centralized subscriber database, for making interaction with the centralized subscriber database and distributing short messages; wherein
the centralized subscriber database is connected to a short message center of the PLMN or 3G network and a comprehensive short message gateway by an extended interface of MAP; and
the comprehensive short message gateway is connected to a short message center of the PSTN or PHS network by SMPP.

8. The communications network system according to claim 3, further comprising:
a comprehensive short message center connected to the centralized subscriber database, for replacing the short message centers of the communications networks and performing interaction with the centralized subscriber database and distribution of short messages; wherein
the centralized subscriber database is connected to terminal offices of the PSTN through an interface of ISUP, to terminal offices of the PHS through an interface of ISUP or an interface of MAP, to mobile switching centers of the PLMN or 3G network through an interface of MAP via a comprehensive short message center.

9. The communications network system according to claim 1, wherein the centralized subscriber database is integrated with the home location register (HLR) of the 3G network.

10. A method for implementing the flexible number plan service, applicable to a communications network system at least comprising more than one type of communications network and a centralized subscriber database connected with the communications networks, wherein the mapping relation of the logical number and the physical number of subscribers of the communications network system is stored in the centralized subscriber database, comprising:
when a calling subscriber initiates a call, a call-originating switching office establishing a relay with the centralized subscriber database and sending the logical number of a called subscriber to the database;
the centralized subscriber database converting the called number based on the self-stored mapping relation of the logical number and the physical number of the called subscriber, obtains the physical number of the called subscriber and sending back the physical number to the call-originating switching office;

the call-originating switching office re-routing the call based on the physical number of the called subscriber.

11. The method according to claim 10, wherein
in the step of sending the logical number, the call-originating switching office further sends the physical number of the calling subscriber to the centralized subscriber database; and
in the step of converting the called number, the centralized subscriber database further converts the physical number of the calling subscriber into the logical number thereof in accordance with the self-stored mapping relation of the logical number and the physical number of the calling subscriber for use of charging the calling subscriber and displaying the number of the calling subscriber.

12. The method according to claim 10, wherein the centralized subscriber database further storing the authentication data of subscribers of the communications network system,
before converting the called number, the method further comprises:
the centralized subscriber database making authentication for the subscribers related with the call based on the self-stored authentication data, deciding whether this call is permitted, if not permitted, notifying the call-originating switching office to stop this call; if permitted, continuing with the step of converting of the called number.

13. The method according to claim 10, further comprising:
after the call-originating switching office obtaining the physical number of the called subscriber, the call-originating switching office removing the relay connecting with the centralized subscriber database.

14. The method according to claim 10, wherein the call-originating switching office makes interaction with the centralized subscriber database through the interface of ISUP, the interface of INAP, or the interface of MAP.

15. A method for implementing mixed services, applicable to a communications network system at least comprising more than one type of communications network and a centralized subscriber database connected with the communications networks, wherein subscriber data of subscribers of the communications network system are pre-stored in the centralized subscriber database, comprising:
when the calling subscriber initiates a call, a call-originating switching office establishing a relay with the centralized subscriber database, and sending the number of the calling subscriber and/or a called subscriber to the database;
the centralized subscriber database processing the number of the calling subscriber and/or the called subscriber based on the self-stored subscriber data, and sending back the processed number of the calling subscriber and/or the called subscriber to the call-originating switching office; and
the call-originating switching office re-routing the call based on the processed number of the calling subscriber and/or the called subscriber.

16. The method according to claim 15, wherein the subscriber data comprising the subscription data of an intelligent service;
the step of processing the number of the calling subscriber and/or the called subscriber comprises: deciding in accordance with the number of the calling subscriber and the called subscriber whether the calling subscriber or the called subscriber has subscribed one of the intelligent services, if yes, sending back an access code of the subscribed intelligent service to the call-originating switching office; and
the call-originating switching office re-routing this call based on the access code of the intelligent service.

17. The method according to claim 15, wherein the subscriber data comprises data of a WAC (Wide Area CENTREX) service;
the step of processing the number of the calling subscriber and/or the called subscriber comprises: obtaining the WAC where the calling subscriber is as well as a short number of the calling subscriber by analyzing the number of the calling subscriber, converting the short number of the called subscriber to a long number in accordance with the data of the WAC service where the calling subscriber is to acquire the out-group prefix and the long number of the called subscriber, and then sending the short number of the calling subscriber, the out-group prefix, and the long number of the called subscriber to the call-originating switching office; and
the call-originating switching office re-routing the call based on the short number of the calling subscriber, the out-group prefix, and the long number of the called subscriber.

18. The method according to claim 15, wherein
the step of processing the number of the calling subscriber and/or the called subscriber comprises: obtaining an actual number of the called subscriber based on the analysis of the number of the called subscriber and the self-stored subscriber data, and sending the actual number to the call-originating switching office; and
the call-originating switching office re-routing this call based on the actual number.

19. The method according to claim 18, wherein
the subscriber data comprises data of Unified Number service and the actual number is the location number of the called subscriber;
the subscriber data comprises data of Multi Subscriber Number service and the actual number is the physical number of the called subscriber;
the subscriber data comprising data of Traveler to Home service and the actual number is the family fixed phone number that the called subscriber has registered.

20. The method according to claim 15, wherein the subscriber data comprise network traffic information;
the step of processing the number of the calling subscriber and/or the called subscriber comprises: deciding in accordance with the number of the calling subscriber and/or the called subscriber as well as the self-stored network traffic information whether to enable or disable this call, and sending back the enabling or disabling information to the call-originating switching office; and
the call-originating switching office deciding whether to re-routing the call based on the enabling or disabling information.

21. The method according to claim 15, wherein the subscriber data comprise the trans-3G flag of a PHS subscriber;
the step of processing the number of the calling subscriber and/or the called subscriber comprises: when determining in accordance with the called number that the called subscriber is a PHS subscriber and the trans-3G flag of this subscriber indicates that the subscriber has transferred to 3G network, the centralized subscriber database requesting a visiting mobile switching center (VMSC) for the roaming number of the called subscriber according to the self-recorded address of the VMSC where the called subscriber is and sending the roaming number of the called subscriber to the call-originating switching office; and the call-originating switching office re-routing the call based on the roaming number of the called.

22. The method according to claim 15, wherein the centralized subscriber database further stores the authentication data of subscribers of the communications network system, further comprising:

before the processing the number of the calling subscriber and/or the called subscriber, the centralized subscriber database making authentication for the calling subscriber and/or the called subscriber based on the self-stored authentication data, deciding whether the call is permitted, if not permitted, notifying the call-originating switching office to stop the call; if permitted, continuing to process the number of the calling subscriber and/or the called subscriber.

23. The method according to claim 15, further comprising:

after the call-originating switching office obtains the processing result, the call-originating switching office removing the relay connecting with the centralized subscriber database.

24. The method according to claim 15, wherein the call-originating switching office interacts with the centralized subscriber database via an interface of ISUP, INAP, or MAP.

25. A method for communicating short messages based on a flexible number plan, applicable to a communications network system at least comprising more than one type of communications network and a centralized subscriber database connected with the communications networks, wherein the mapping relation of the logical number, physical number and address of short message centers are stored in the centralized subscriber database, comprising:

a source short message center sending a logical number of a destination subscriber to the centralized subscriber database and requesting the address of a destination short message center after receiving a request for forwarding a short message;

the centralized subscriber database finding the physical number of the destination subscriber and the address of the destination short message center based on the logical number of the destination subscriber, and sending back the physical number and the address of the destination short message center to the source short message center based on the self-stored mapping relation of the logical number and physical number of subscribers of the communications network system as well as the address of the short message centers;

the source short message center forwarding the short message to the destination short message center according to the address of the destination short message center, and the destination short message center issuing the short message to the destination subscriber according to the physical number of the destination subscriber.

26. The method according to claim 25, wherein the subscriber sending the short message is a flexible number plan subscriber;

the source short message center further sends the physical number of the subscriber sending the short message to the centralized subscriber database;

the centralized subscriber database, based on the self-stored mapping relation of the logical number and physical number of the subscriber, converts the physical number of the subscriber who sends the short message into the logical number thereof for use in charging and number displaying and sending back the converted number to the source short message center.

27. The method according to claim 25, wherein the centralized subscriber database further stores authentication data of subscribers of the communications network system, further comprising:

before finding the physical number of the destination subscriber and the address of the destination short message center, the centralized subscriber database deciding according to the self-stored authentication data whether it is permitted to forward the short message, if not permitted, notifying the source short message center to stop forwarding the short message; if permitted, continuing to find the physical number of the destination subscriber and the address of the destination short message center.

28. The method according to claim 25, wherein the source and destination short message center are short message centers of PSTN, PLMN, PHS, or 3G network.

29. The method according to claim 25, wherein the source and destination short message center are comprehensive short message gateways which connects to short message centers of PSTN, PLMN, PHS, or 3G network and forwarding short messages.

30. The method according to claim 25, wherein the source and destination short message center are comprehensive short message centers.

* * * * *